(12) United States Patent
Gillum et al.

(10) Patent No.: US 10,168,225 B2
(45) Date of Patent: Jan. 1, 2019

(54) SYSTEM AND METHOD FOR DETECTING EXTRASOLAR LASER PULSES

(71) Applicant: SETI Institute, Mountain View, CA (US)

(72) Inventors: Eliot Gillum, San Francisco, CA (US); Alan Holmes, Goleta, CA (US)

(*) Notice: Subject to any disclaimer, the term of this patent is extended or adjusted under 35 U.S.C. 154(b) by 109 days.

(21) Appl. No.: 15/469,413

(22) Filed: Mar. 24, 2017

(65) Prior Publication Data
US 2017/0299441 A1 Oct. 19, 2017

Related U.S. Application Data

(60) Provisional application No. 62/313,063, filed on Mar. 24, 2016.

(51) Int. Cl.
*G01J 11/00* (2006.01)
*H04N 5/247* (2006.01)
*G01J 3/28* (2006.01)
*G01J 1/42* (2006.01)

(52) U.S. Cl.
CPC ............. *G01J 11/00* (2013.01); *G01J 1/4228* (2013.01); *G01J 3/2803* (2013.01); *H04N 5/247* (2013.01)

(58) Field of Classification Search
CPC . G01J 11/00; G01J 1/44; G01J 1/4228; G01N 2201/0697; G02B 21/16
USPC .............................. 250/214.1, 203.2, 203.3
See application file for complete search history.

(56) References Cited

U.S. PATENT DOCUMENTS 9,488,525 B2 * 11/2016 Liu ..................... G01J 11/00

* cited by examiner

*Primary Examiner* — Que T Le
(74) *Attorney, Agent, or Firm* — Steptoe & Johnson LLP

(57) ABSTRACT

A system and method for detecting laser pulses is disclosed. According to one embodiment, the present system detects an extrasolar laser pulse, ideally repeated pulses, by observing the pulse, characterizing the pulse, and confirming the data related to the pulse.

1 Claim, 4 Drawing Sheets

SYSTEM AND METHOD FOR DETECTING EXTRASOLAR LASER PULSES

CROSS-REFERENCE TO RELATED APPLICATIONS

The present application claims the benefit of and priority to U.S. Provisional Patent Application No. 62/313,063 entitled "SYSTEM AND METHOD FOR DETECTING LASER PULSES" filed on Mar. 24, 2016, which is hereby incorporated by reference.

FIELD OF TECHNOLOGY

The present disclosure relates in general to purified natural color pigments and colorants and processes for preparing and processing the pigments and colorants.

BACKGROUND

A civilization might select optical wavelengths for communication. Detecting such signals may be difficult. Prior systems assume that such signals have the following characteristics:

number of particles received must significantly exceed the background, signal must exhibit some non-natural property, energy per quantum should be minimized, other things being equal, negligible absorption by interstellar medium (and atmosphere), negligible deflection by galactic fields, should be easy to generate, launch, and capture, and velocity should be as high as possible.

Prior systems have used variants of photomultiplier tubes or atmospheric Cherenkov radiation as detectors. These techniques, however, are not cost effective enough to cover all the sky, all the time.

SUMMARY

A system and method for detecting laser pulses is disclosed. According to one embodiment, the present system detects an extrasolar laser pulse, ideally repeated pulses, by observing the pulse, characterizing the pulse, and confirming the data related to the pulse.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

Figure 1:
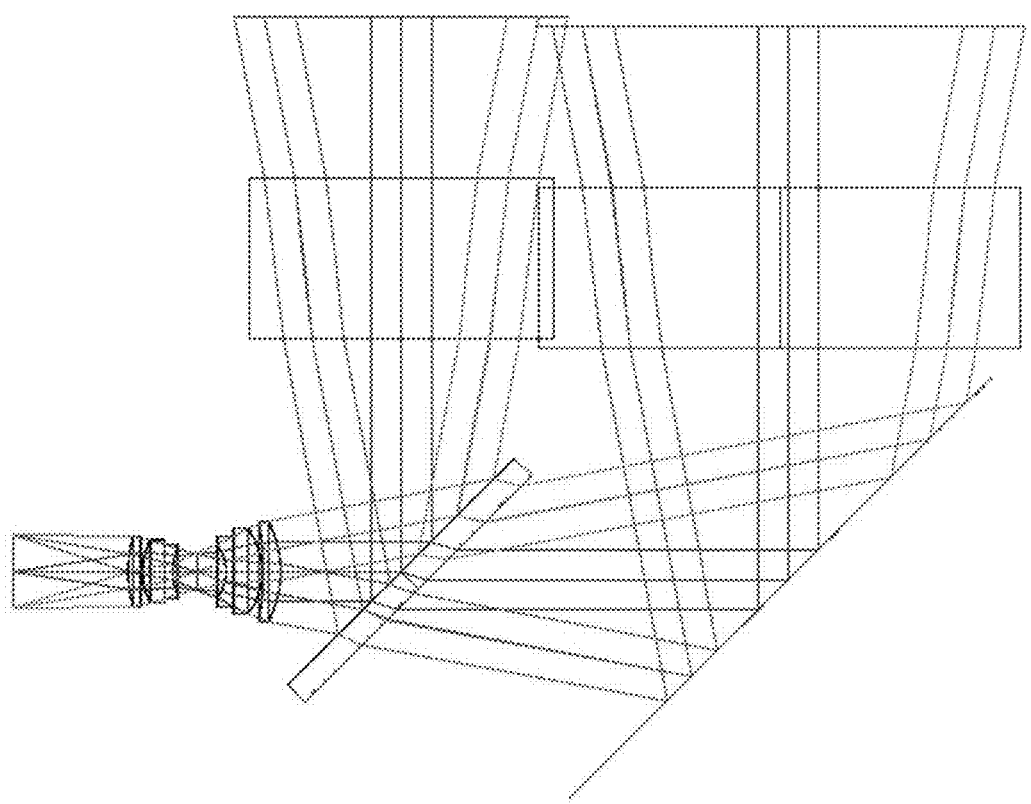
FIG. 1 illustrates an exemplary system that isolates light by wavelength in order to detect monochromatic light, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

The detailed description is to be construed as exemplary only and does not describe every possible embodiment since describing every possible embodiment would be impractical, if not impossible. Numerous alternative embodiments could be implemented, using either current technology or technology developed after the filing date of this application.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

The present disclosure relates to a system and method for detecting laser pulses. According to one embodiment, the present system detects an extrasolar laser pulse, ideally repeated pulses, by observing the pulse(s), characterizing them, and confirming the data. This may be for identification of previously unknown natural phenomenon, characterizing and quantifying previously known phenomenon, or the Search for Extraterrestrial Intelligence (SETI).

The present system localizes a candidate source on the sky to ~1 arcmin in RA and Dec (e.g., 1.2 arcmin per pixel) by using two camera systems. Each camera system uses two prisms with one CCD camera. The two prisms, at the top of the diagram, are oriented 180 degrees from each other so as to produce mirror image spectra, which are imaged onto a single focal plane via a standard lens, such as a Fujinon f/1.4, 25 mm focal length. The prisms are chosen to create spectral dispersion but minimal displacement.

In an alternative embodiment, more than 2 prisms are combined to produce additional spectra. It is natural, using beam splitters, to use a power of 2. A further alternative embodiment might use gratings, either in transmission or reflection, to create multiple spectra. The distribution of the light between spectral orders can be adjusted to suit false positive and dynamic range requirements.

Naturally, many lenses, mirrors, or telescopes are possible to focus the light, where increased aperture is generally desirable but different focal lengths/spatial resolutions might be employed. The prism or grating is not necessarily the first element in the optical train. The amount of spectral dispersion can be chosen by one skilled in the art to trade off desired spectral resolution and focal plane span for a given point source.

FIG. 1 illustrates an exemplary system that isolates light by wavelength in order to detect monochromatic light, according to one embodiment. The system illustrated in FIG. 1 isolates light by wavelength in order to detect monochromatic light, while the dual prisms reduce false positives by providing simultaneous detection of two signals, a "signature" representative of an optical pulse as compared to a single pixel radiation event.

The camera is readout continuously using a Time Delay and Integration (TDI) technique, whereby rows are shifted downward and read out without pause. The result is that a stellar image is smeared out vertically. However, a pulsed laser detection will produce a starlike point since the length of the pulse is short compared to the frequency of the row shifting. Each camera has significant vertical ambiguity due to the use this TDI technique. It will not be possible to know which star, out of the candidates along a vertical column, produced the pulse. With two camera systems oriented at 90 degrees (or some other angle) this ambiguity can be removed.

Figure 2:
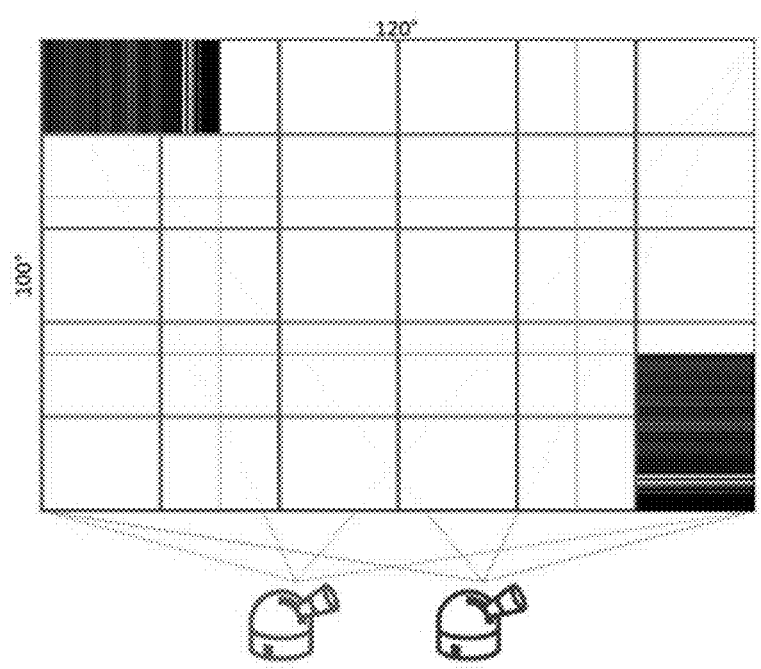
FIG. 2 illustrates an exemplary system having two cameras per FOV design with perpendicular orientation, according to one embodiment.

FIG. 2 illustrates an exemplary system having two cameras per FOV design with perpendicular orientation, according to one embodiment. Occasionally, and more likely if the cameras are geographically separated, one camera may observe an event while the other does not. This could be due to any number of phenomenon: clouds, maintenance, hardware failure, airplanes or satellites flying overhead, etc. We will accept occasional partial localizations as a beneficial tradeoff for the increased observational duty cycle and necessary operational logistics. Since no single event, partial or not, is likely to prove extraterrestrial intelligence (ETI) signal on its own, partials may be an important confirmation of some other signal and, if nothing else, should be a small amount of data and hence not worth throwing away.

It should be noted that, due to the TDI readout, the ambiguity from a single camera is not just vertical, it's also in time—the time it takes a row to shift from the top to the bottom of the CCD array, which is a little over 1 second. When two perpendicular cameras observe the same event, the act of resolving the positional ambiguity simultaneously localizes the timing to within milliseconds as well. This also means, however, that a one-site observation not only leaves the event localized to only 20 degrees but also a window in time equal to that same ~1 second interval.

In an alternate embodiment, a second, orthogonal camera is not present. In this case, it will often be the case that only one star is within a reasonable distance from the event center, and the event can therefore be assumed to originate from that star. The arrival time is then calculated given that assumption.

According to one embodiment, the present system quantifies all monochromatic anomalies and other interference and takes advantage of having two cameras per field of view in two ways. First, since the camera readout technique introduces significant vertical ambiguity, the paired cameras are oriented orthogonally such that each isolates one dimension of a co-observed event. Second, in one embodiment, the two cameras are separated by ~100 miles, to decouple geographically correlated weather and false positives. In alternative embodiments, paired cameras may have near-zero separation or be separated by 1000 miles or more.

True Positives

Because lasers amplify only one very narrow emission line at a time, the present system searches for monochromatic signals. Spatial, temporal, and spectral broadening is minimal. If a signal persists long enough to move perceptibly, given its presumed interstellar distance, it would move with the stars.

To have the greatest reach for a given input energy, transmitted pulses should be as short as possible. The present system has a TDI line readout rate of 2000 Hz, according to one embodiment, hence the maximum frequency of distinguishable repeated pulsation is 1000 Hz. Modulations faster than this will look continuous to the system, although the pulse will still be captured if it turns on or off during observation. All pulses shorter than 2000 Hz will be captured as one event by the detector, as will any repeated pulsation which may later be characterized as a false positive (e.g., airplane strobe).

The camera field of view orientations are such that one of the two paired camera's horizontal axis is maximally aligned with celestial motion so as to maximize the ability to measure signal motion. With the ST-1603 camera and optical system, stars move a maximum rate of one pixel every 5 seconds, therefore anything which moves faster can be ruled out as natural.

The present system captures spatial, temporal, amplitude, and wavelength evolution.

Candidate Signal Definition

Signal candidates are defined using a hierarchy of increasingly strenuous tests.

| ID | Name | Description |
| --- | --- | --- |
| C.1 | Interesting pixel | Pixel is T greater than its horizontal N neighbors and (previous Z values OR previous value was a C.1) |
| C.2 | Pixel pair | Pairs of pixels > $X_{min}$ but < $X_{max}$ pixels apart, with absolute brightness within 5% of each other |
| C.3 | Moves too fast | Eliminate airplane strobes and satellite glints. Strobe's periodic nature will require grouping of the events. |

In an alternative embodiment, contiguous hot pixels are grouped into "blobs." These blobs can then be paired, or additionally checked for shape prior to doing so. Allowable shapes are circles/2D-Gaussians and diagonally extended versions of such, with only one allowable slope according to the stellar drift rate of that FOV.

The extraction of C.1 candidates may be done in many different ways. In one embodiment, pixels "hotter" than their neighbors and vertical predecessors might be chosen. In another embodiment, subsets of pixels may be correlated with pre-computed Gaussians or known point spread functions of the optical system. Optimizations may be applied to eliminate pixels which are not local maxima.

In a further alternative embodiment, characterization of events is done via artificial intelligence. Candidate characterization is not done manually as above, but instead only the dimensions of characterization are coded directly and a machine learning or other statistical algorithm, whether supervised or not, is applied to the data to classify events.

To quantify and characterize sources of interference, all occurrences of the above events are logged by the present system. Samples may be probabilistically kept of all of the events, for example C.1 which will initially be 1%.

Cameras overlap other cameras on all sides except at horizon. The present system does not require all-sky coverage to be effective.

False Positives

| Type | Frequency | Mitigation |
| --- | --- | --- |
| Secondary cosmic rays | 1.5 sec | Double prism, reduces rate to once every 10 days |
| Airplane strobes | Site dependent | Recognized by multiplicity, velocity, appearance and locality |
| Satellite glints | Hourly | Reduced using prism and paired sites |
| Laser altimeters | Unknown | Reduced by using remote paired sites |
| Aurora | Rare at low latitudes | Diffuse: high spatial localization criteria, paired sites |
| Transient Luminous Events (blue jets, sprites, elves)[1] | 1 k/year | Lightning related, the system is less likely to see these, blue jets seem to be the only type that are spatially localized |
| Terrestrial Gamma-ray Flashes (TGFs) | 50/day | Although on a millisecond timescale, presumably its optical counterparts would be broadband and spatially extended |

Potential False Negatives

In the spectral domain, the spectral line spread over the pixel boundary is mitigated by also looking at pairs of pixels. If a pulse has multiple spectral lines, the present system processes it as all possible permutations, e.g. (x1y1y2x2), (x1x2y1y2), (x1y1x2), etc.

In the time domain, a pulse is split over two intervals. One possible system mitigates the split by looking at pairs of rows. Another coalesces contiguous entities for processing as one.

In the spatial domain, detections can be split over cameras. A virtual/mosaic camera may be used to mitigate the split. In another embodiment, detections are duplicated over multiple cameras. The present orthogonal cameras observe the event and allow confirmation of duplicity. Any combination of spectral, time or spatial domain techniques may be used.

Search Radius

Because the Interstellar Medium (ISM) absorbs at optical frequencies, the present system examines various tolerances for extinction losses to derive an effective maximum detection radius if one assumes that ET has no greater technology than we do currently. The distance with the present system may range from 2000 light years (at 50% loss) to about 9000 light years (at 90% loss).

Optical System
Computer Architecture

Figure 3:
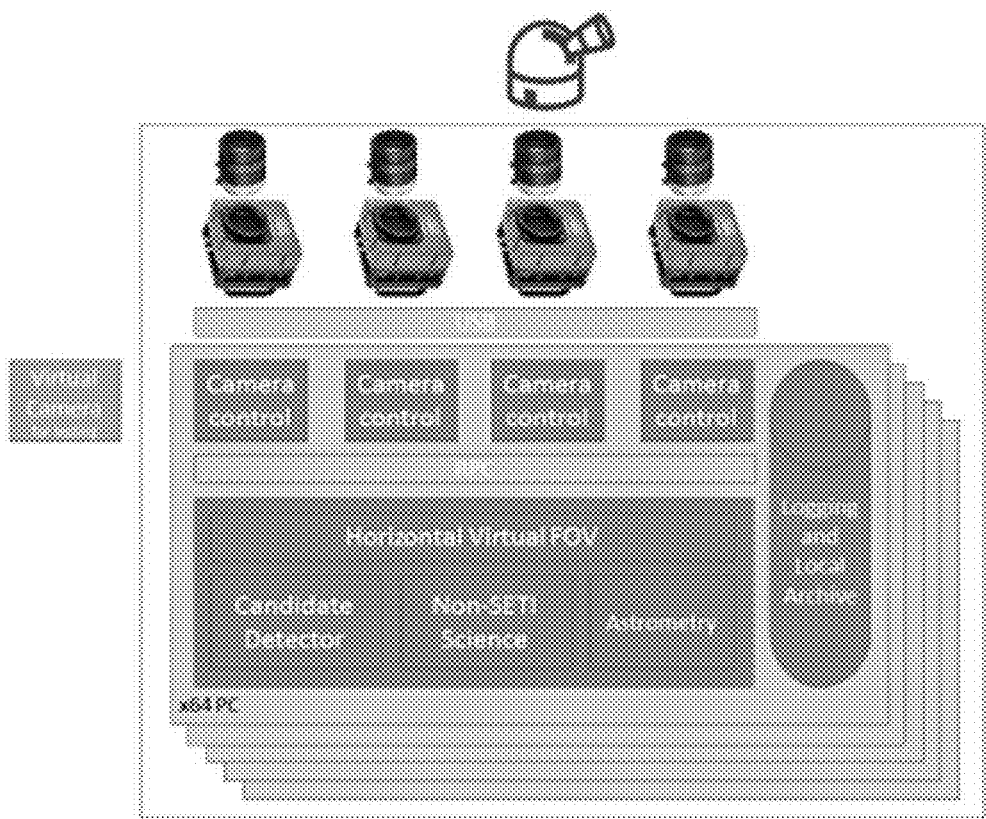
FIG. 3 illustrates an exemplary optical system, according to one embodiment.

FIG. 3 illustrates an exemplary optical system, according to one embodiment. According to one embodiment, cameras are connected to a PC via USB. Virtual machines may be utilized to share computational resources while bypassing artificial limits of cameras per PC.

According to one embodiment, the local software consists of two processes: the module to interface with the cameras, and the module to direct and make observations. This separation facilitates many operational characteristics, like failure recovery or software upgrade. The modular architecture allows the system to use a virtual camera process to facilitate testing.

The camera controllers communicate with the process via shared memory, to facilitate high bandwidth with minimal computational overhead, and the observation module manages the controller's lifetime, starting them on boot-up and killing them as necessary.

Imaging Subsystem Readout Timing

According to one embodiment, the present system includes an imaging system that uses Time Delay and Integration (TDI). TDI is a readout technique where charge is sequentially accumulated and shifted down the CCD. The present system uses TDI to purposefully smear out stars to reduce their dynamic range. This avoids saturated pixels and hence missing one of a candidate's two pixels.

Figure 4:
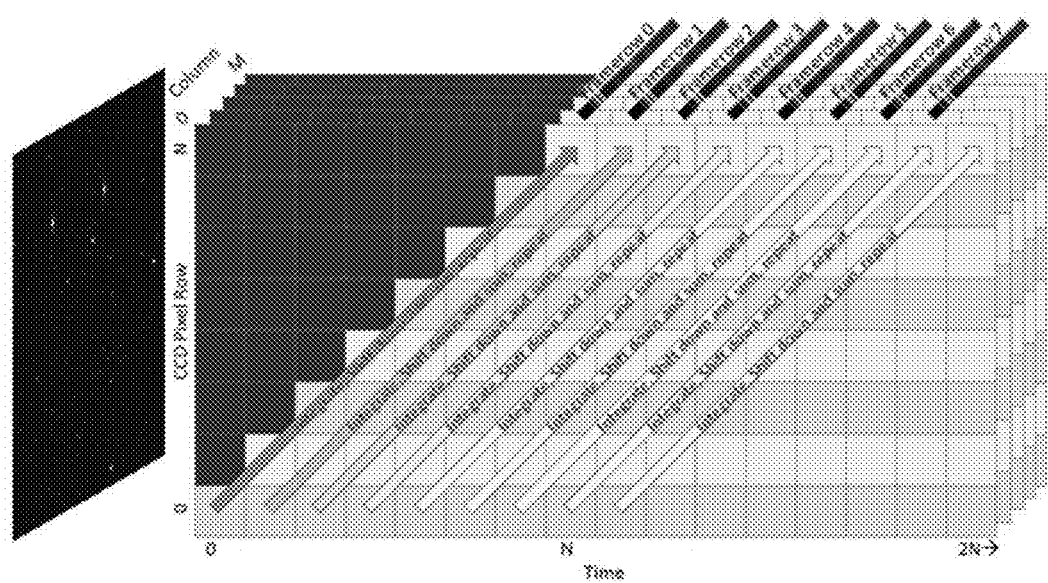
FIG. 4 illustrates an exemplary TDI process, according to one embodiment.

As a result, the output of our system is a "framerow," the vertical summing across time of the full height of the CCD. FIG. 4 illustrates the TDI process, according to one embodiment.

According to one embodiment, the present system ensures that TDI rows have a sub-millisecond timestamp attached upon reception by the PC for comparison to other TDI rows. The variance between TDI rows are tracked, including last delta, average delta, etc.

According to one embodiment, the present system performs all computation on TDI rows on logical values, adjusted for possible overexposure due to occasional PC delay.

Standard dark frame and flat field corrections may be applied to both TDI and full frame images produced by the system, with the adaptations for TDI being straightforward for one skilled in the art.

Camera Control Interface

The present system implements separate command-line and RPC interfaces. To facilitate manual interaction and testing, the command line interface accepts the following commands.

| Parameter | Description |
| --- | --- |
| listUSB | Enumerates up to 8 USB cameras attached to the current PC/VM. Must be the only parameter specified. |
| fullFrame X | Takes a full frame image for X milliseconds and writes it out to FullFrame_Xms_DateTime.fits in its current directory |
| tdi X | Records TDI data for X seconds. If X is 0, it will connect to shared memory to upload data and listen for commands, do logging, etc. |
| plateMatch X | Performs plate matching on the specified FITS file or directory containing such files for any files which don't already have the associated FITS headers |
| rePlateMatch X | Re-does plate matching and overwrites all plate matching related FITS headers on the specified FITS file or directory containing such files |

The RPC interface services the following communication via shared memory segments.

| Interaction | Description |
| --- | --- |
| Online | Status, comm checksum and a timestamp of the most recently recorded TDI framerow. The status will share what state CamCon is in. The comm checksum will validate that all structure members and sizes used for communication are identical. If the timestamp ever gets sufficiently out of date (30 sec), the brain will "reboot" this camera |
| Terminate | Command from the brain to shut down this CamCon.exe instance |
| Full frame | Directs CamCon to take a full frame exposure of a given length and pass it up. Also saves frame to disk per -fullFrame command line parameter. |
| TDI upload | TDI framerow and associated metadata waiting to be picked up by the observation module |

According to one embodiment, the present system flushes data to disk in a separate thread to ensure it is always ready to accept new framerows from the camera. Files are pre-allocated to their final size to speed initial and subsequent file IO.

Starfield Registration

Because the cameras have a fixed mount, they determine what part of the sky they are observing via plate matching. According to one embodiment, on startup and candidate detection, the present system switches out of TDI mode and takes a full frame image. The prisms cause significant artifacts which require substantial processing to eliminate. In one embodiment, blobs of elevated photon flux are extracted and paired according to matching criteria. In order to establish a consistent frame of reference across the FOV, the optical system creates symmetric artifacts such that a synthetic star can be placed according to a function of their position, such as average. The resulting synthetic image is passed to a plate matching engine for image extent coordinates. To assist in accurate registration, relative star brightness is preserved from original to synthetic images.

To avoid losing the time evolution of a potential signal, paired sites are designated "time" and "space." The space site takes the full frame 10 sec exposure. The time site continues observing for the ~15 seconds while this happens and once it can be safely assumed that the space site is back in TDI mode, and then it will take its own full frame image.

According to another embodiment, the system builds a continuous map of the field of view (FOV) by using a startup map and noting when stars enter or exit the FOV. This simplifies operations and improves data quality, as well as potentially leading to synthetic image generation and other science data in the process. The TDI to image reconstruction engine operates in real-time as well as against stored TDI data.

Storage

Sets of TDI framerows, which might be called "images" will be stored in files for possible later use. The storage hierarchy of the system, according to one embodiment, is as follows:

one directory for each day, named for example 2015-04-14

In each day directory, a directory for each camera, e.g. Cam0001

In each camera directory, a file per minute, named "13-05-19.tdi.fits" (hour:min:sec)

1. There is one log file in this directory, to persist any errors, warnings, or messages the camera encountered, called "CamCon.log"
2. Successful and failed C1 and C2 candidate metadata is stored in "Candidates.csv." For C2 candidates where more than two C1's exist within the allowed separation, all possible permutations will be logged to maximize fidelity and subsequent analysis.
3. This directory stores images of candidates, named "13-05-19.977-C2.tdi.fits", and plate matching images, named "FullFrame_2015-04-14T13-05-19.977_C2.fits"

The file system maximizes IO performance by limiting directories to at most a few thousand entries. It is also global, meaning all files from all cameras can be integrated without any renaming. While real-time processing happens against data in RAM, these stored images are used for offline processing, which simplifies and reduces resource contention.

Image File Format

Given its great simplicity and flexibility, "images" are stored in the FITS format. Software processing the raw data is aware of this and decodes the temporal information.

Every image is a minute's worth of data. The image has as many rows as the TDI makes shifts per minute. Hence, according to one embodiment, the ST-1603 produces an image 200*60=12,000 pixels tall by 1530 pixels wide.

The FITS headers in each file are listed below.

| Name | Description |
|---|---|
| SIMPLE | "T" per FITS spec |
| BITPIX | 16, for our unsigned 16-bit integers |
| NAXIS | 2, for our X and time dimensions |
| NAXIS1 | Number of rows, approximately 200 * 60 sec = 12,000 |
| NAXIS2 | Width of rows, 1530 for the ST-1603 camera |
| CTYPE1 | Standard image registration parameters |
| CTYPE2 | " |
| CRVAL1 | " |
| CRVAL2 | " |
| CDELT1 | " |
| CDELT2 | " |
| CROT1 | " |
| CROT2 | " |
| CRPIX1 | " |
| CRPIX2 | " |
| ORIGIN | "name" |
| DATE-OBS | The time of the first observation, UTC formatted as yyyy-mm-ddTHH:MM:SS[.sss] |
| DATExxxx | Potentially used to denote TDI time information |
| INSTRUME | "name" |
| TELESCOP | "Site %s, Camera %s", substitution strings TBD |

The format of the candidate log file containing both successful and candidates that failed the tests has comma-separated values, or CSV. The fields are as following:

| Name | Description |
|---|---|
| Date/Time | UTC, same format as DATE-OBS in FITS |
| Level | Highest candidate level test that this signal passed, e.g. "1" or "2" |
| RA | Right ascension, in decimal degrees, of the center of the event |
| Dec | Declination, in decimal degrees, of the center of the event |
| RA_err | Ambiguity in the RA, plus or minus from the specified center |
| Dec_err | Ambiguity in the declination, plus or minus from the specified center |
| More | Brightness, delta, history |

Candidate Correlation

Since a single signal will likely not demonstrate ETI or a previously unknown natural phenomenon, the present system looks for repetition across days to years, and subsequent follow up study. Particularly, but not necessarily operating with all sites' data in its purview, and across the full time span of observations, the present system cross-correlates candidates to identify patterns, the simplest of which is simple repetition from the same location on the sky.

Operations

Log files are uploaded regularly, if not in near real time, so that reports can be run. Error reports provide information on the operational health of the present system (e.g., looking for crashes, exceptions, ASSERTs, etc.) Asset tracking reports track boot up and shutdown, cameras plugged in and their serial numbers.

The above example embodiments have been described hereinabove to illustrate various embodiments of a system and method of detecting laser pulses. Various modifications and departures from the disclosed example embodiments will occur to those having ordinary skill in the art.

What is claimed is:
1. A method, comprising:
detecting an extrasolar laser pulse;
observing the extrasolar pulse;
characterizing the extrasolar pulse, and
confirming the data related to characterizing the pulse.

* * * * *